C. L. FORTIER.
THERMOSTATIC CONTROL DEVICE.
APPLICATION FILED NOV. 9, 1914.

1,267,319.

Patented May 21, 1918.
3 SHEETS—SHEET 3.

Inventor
Charles L. Fortier,

Witnesses

By Dodge & Sons,
Attorneys

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

THERMOSTATIC CONTROL DEVICE.

1,267,319.

Specification of Letters Patent.

Patented May 21, 1918.

Application filed November 9, 1914. Serial No. 871,147.

*To all whom it may concern:*

Be it known that I, CHARLES L. FORTIER, a citizen of the United States, residing at Milwaukee, in the county of Milwaukee and State of Wisconsin, have invented certain new and useful Improvements in Thermostatic Control Devices, of which the following is a specification.

This invention relates to the automatic thermostatic control of refrigerating devices of the absorption type, and particularly to the control of that class of machines in which a single chamber serves alternately as the drive-off and absorption chamber thus producing successive periodic cycles each of which is completed before the initiation of the next.

Features of the invention are first, the use of a thermostat subject to the temperature of the receptacle or compartment cooled to stop entirely the operation of the refrigerating means when this receptacle or compartment is cooled to the desired minimum temperature, and then maintain the refrigerating device inoperative until the temperature rises to a predetermined maximum; second, the provision of means for preventing the stopping action of the thermostatic control until the completion of the absorption portion of any cycle thus avoiding waste of the energy expended in the preceding drive-off portion of the cycle and insuring the position of the apparatus for the effective starting of the next complete cycle when it shall again be allowed to operate; third, the application of one or both of the above features to the control of that type of refrigerating machine in which the flow of water for heat transfer purposes is interrelated with the flow of heating energy for drive-off purposes so that the control of one, for example the control of the water flow, will operate as a common control for both; and finally, various mechanical and other details ancillary to the above special features as will be apparent from a consideration of the following description.

A successful application of the invention to a machine of the type set forth is illustrated in the accompanying drawings, in which:—

The same parts are identified by the same reference numerals throughout the figures.

The combined drive-off and absorption tank is represented at 5 and consists of a closed tank which contains a mixture of water and ammonia gas and which is at times heated to drive off the gas from the water by means of a Bunsen gas burner 6, this being shown as a familiar example of a controllable heating means. This is controlled by means of a gas valve 7 and a constantly burning pilot light 8. Any other suitable controllable heating means obviously might be substituted. The drive-off-absorption tank 5 is provided with an inwardly extending thimble 9 against the inward end of which bears a bar 10. The bar 10 has a greater coefficient of expansion than the thimble 9, and the members 9 and 10 thus form a thermostat whose operation will later be described. Leading from the tank 5 is a pipe 11 which extends to a rectifier 12. The function of the rectifier 12 is to condense any water vapor which may leave the drive-off tank with the gas and insure its return to the tank 5. Consequently only ammonia gas passes from the rectifier 12. Thence it goes through a check valve 13 to condensation coils 14 in which the gas is condensed to liquefaction by pressure created by its expansion under heat in the tank 5. The condensing action in the rectifier 12 and coils 14 is caused by a cooling bath of water contained in the tank 15 which is provided with an overflow connection 16 to an overflow tank 17 placed beneath the machine and designed to collect all waste water flowing from the machine. The tank 17 is provided with an overflow 18 to a sewer or other waste.

From the condenser coils a pipe 19 conducts the liquefied gas to an equalizer valve 20 which is closed during the drive-off portion of the cycle but opens automatically at the beginning of the absorption portion thereof. Thence, during the absorption portion of the cycle it goes to an expansion valve 21 through which the liquefied gas is expanded into the expansion coils 22, and thence returns in its expanded condition through a pipe 23 to the generator absorption tank 5, where it is again absorbed by the water, it being understood that at this time the tank 5 is cooled to reduce the pressure therein.

The expansion coils are immersed in brine contained in a tank 24 and this brine is cooled by the absorption of heat by the expanding gas. The tank 24 full of brine thus becomes the cooling medium for the refrigerator 25 which is only diagrammatically illustrated. The tank 24 may itself be the refrigerating chamber, as in ice making apparatus, or the refrigerator may take any usual form.

A pipe 26 leads to a Bourdon tube 27 whose lower extremity is provided with a forked head 28 and this straddles a bar 29 having an adjustable stop 30 at its end. The bar 29 is connected to the lower end of a pivoted latch 31 which is urged by a counterweight 32 to swing to the right. A similar pivoted latch 33 is also urged to swing to the right by a counterweight 34 and is provided with a rod 35 which slides in the forked end 36 of a rod 37. The rod 36 is provided with an adjustable stop 38 and the rod 37 is fulcrumed at 39 and urged to the right by a spring 40. Just above the fulcrum 39 the thermostat rod 10 previously mentioned is connected to the pivoted rod 37 so that upon a rise of temperature in the tank 5 the latch 33 is swung to the left, while upon a falling of temperature it is released so that it may swing to the right under the action of its counterweight. Similarly upon a fall of pressure in the condensing coils 14 the latch 31 will be drawn to the left while upon a rise of such pressure the latch 31 will be permitted to swing to the right under the action of its counterweight. The latches 31 and 33 coöperate in the manner later to be described with lugs 41 and 42 on a lever 43 to hold the lever 43 in its upper and lower positions respectively.

This lever 43 is pivoted at 44 and is actuated by a float 45 in the tank 15. It is connected at the left hand end with a valve 46 which controls the flow of water from the tank 15 to a spray pipe 47 and this sprays water upon the tank 5 during the absorption portion of the cycle as will appear. The right hand end of the lever 43 is in engagement with a counterweighted lever 48 which operates a valve 49 leading from a float tank 50. The tank 50 is provided with an overflow 51 and this overflow as well as the valve 49 when open discharge water from the tank 50 into the tank 15. A float 52 is mounted in the tank 50 and is connected by a rod 53 with the gas valve 7 previously mentioned, so that when the float 52 is raised the valve 7 is opened and when the float 52 is lowered the valve 7 is closed. In order to prevent the operation of the float 52 by accidental leakage through the electric control valve later to be described, the tank 50 is provided with a minute leak port 50$^a$ necessarily exaggerated in size in the drawings, this port being merely sufficient to discharge such leakage from the tank and not sufficient to affect the normal functions of the float 52.

The parts so far described constitute elements of a refrigerating outfit of the general type which it is my purpose to control, and preparatory to an explanation of the control mechanism I shall describe the cycle of operation of the refrigerating machine.

During the operation of the machine the pilot light 8 is constantly burning and water is constantly supplied to the tank 50 from any suitable source. As the machine approaches the close of the absorption portion of the cycle, that is, as a cycle is about to be completed, the device will be in the position shown in Fig. 1. Water will be flowing through the valve 49 so that the gas valve 7 is closed and the burner 6 is out. The water flows past valve 49 into tank 15, thence through valve 46, and is sprayed by means of the spray pipe 47 over the tank 5, cooling the same. At this time the check valve 13 is preventing return of pressure from the coil 14 to the tank 5, and the cooling of the tank 5 is causing a reduction of pressure therein. This causes equalizing valve 20 to stand open and therefore liquefied ammonia flows from the coil 14 through the pipe 19 and equalizing valve 20 to expansion valve 21. Through this it is expanded into the coils 22 absorbing heat from the brine and thence returns to the tank 5 where it is reabsorbed by the water. The cooling of the tank has, through the action of the parts 9 and 10 released the latch 33, so that it is tending to swing to the right, and when the pressure in the coil 14 drops sufficiently the Bourdon tube 27 will draw the latch 31 to the left. The release of arm 43 by latch 31 marks the end of the cycle. When this occurs, since the water level in the tank 15 is lowered, the arm 43 will drop and will be immediately latched in its lowered position by the latch 33. This places the apparatus in the position shown in Fig.

2. The new cycle now begins. The immediate effect of the falling of lever 43 is to close the valve 46 and the valve 49. This almost immediately causes the rising of the float 52 and the turning on of valve 7 and lighting of burner 6. At the same time the tank 15 will gradually fill with water overflowing through 51. The lighting of the burner 6 and the consequent heating of the tank 5 causes an increase of pressure in that tank and the driving off of the ammonia gas. This increased pressure acting backward through the pipe 23, coils 22 and expansion valve 21 acts upon the equalizing valve 20 to close the latter. The ammonia gas driven off therefore passes through the rectifier 12 where it is freed from water, and thence through check valve 13 to the condenser coil 14. The increasing pressure of the drive-off and the cooling effect of the water in the tank 15 cause liquefaction of the ammonia gas in the coils 14. Meanwhile the increasing pressure in the coils 14 operates the Bourdon tube 27 to release the latch 31 so that it may again be moved by its counterweight. The drive-off continues until such a temperature is reached in the tank 5 that the latch 33 is pulled to the left through the action of the members 9 and 10 thus releasing the arm 43 so that the latter may rise under the action of the float 45 the tank 15 being filled by this time. It is then latched in the upper position by the latch 31. The upward movement of the arm 43 marks the close of the drive-off portion of the cycle and the initiation of the absorption portion. The immediate effect of the rise of lever 43 is to open valves 46 and 49 thus bringing the parts into the position shown in Fig. 1. The descent of the float 52 quickly closes the valve 7 and extinguishes the burner 6. The opening of the valve 46 causes the water in tank 15 to be sprayed upon tank 5 and cool the latter. The resulting reduction in pressure permits the equalizing valve 20 to open and the liquefied gas in the coils 14 to expand through 19, 20, 21, 22, and 23 back to the tank 5 where it is absorbed by the water as already described. The termination of the drive-off and consequently the termination of the complete cycle comes when the latch 31 is drawn to the left so as to release the arm 43 and allow it to again drop as already described.

I have devised a controlling mechanism for such machines which is operative at the moment of dropping of the lever 43 to prevent the initiation of the next cycle if the temperature in the refrigerator 25 or it may be the temperature in the brine tank 24 is at or below a desired minimum, and which will when the temperature again rises above the desired minimum initiate that cycle.

It will be observed that the operation of the machine is wholly dependent upon the supply of water to the tank 50. If this supply should cease at any time the operation of the machine will cease at the completion of the absorption portion of the cycle, because the lighting of the burner 6 to start the drive-off portion of the next cycle can only take place by the rising of the float 52. It is also to be observed that the machine is not adapted to the economical control of its refrigerating action by any attempt to vary the intensity of such action, and I therefore prefer to control its refrigerating action by completely suspending the operation of the machine when the temperature in the refrigerated device reaches the desired minimum. It is also desirable that once the drive-off action is started the cycle should be completed even though the temperature reached the desired minimum during the cycle and before its completion, and I have therefore interposed in the device an automatic cut-out which allows the automatic control device to become operative to effect a stopping of the refrigerating machine just at the end of the absorption portion of the cycle. As already stated this point is marked by the descent of the lever 43 and I therefore prefer to connect this cut-out so that it is actuated by the descent of that lever. Obviously however it might be made to operate by the movement of any part of the machine which occurs at and only at this time. As examples of such parts I may name the latch 31 and its connected mechanism.

The preferred form of my control mechanism therefore takes the form of an electric or other thermostat subject to the temperature to be regulated, a valve actuated by said thermostat to turn on or cut off the supply of water to the tank 50 and a control member actuated by the descent of the arm 43 and interposed between the thermostat and the valve controlled thereby so as to preclude the stopping action of the thermostat upon the valve except at the time of descent of the lever 43. Because of its general adaptability to refrigeration work and the simplicity of the cut-out mechanism which may be used therewith I prefer an electric thermostat to any of the other well known types, but I do not absolutely limit myself thereto.

I shall now describe my automatic control mechanism as applied to a machine such as just described. I provide a tank 54 which is fed by an ordinary constant level float supply valve 55. This receives water through a pipe 56 from an injector mechanism 57 connected with any supply of water under pressure by means of the pipe 58 and drawing a partial supply of water from tank 17 through a strainer intake 59 provided with a check valve indicated generally at 60. This check valve 60 is to prevent waste of water by a back flow from the pipe 58 through the injector mechanism to the tank 17 which would otherwise occur when the float valve 55 closes. If desired all provision for drawing water from the tank 17 may be omitted and the water supply may be solely received through the pipe 58.

Figure 4:
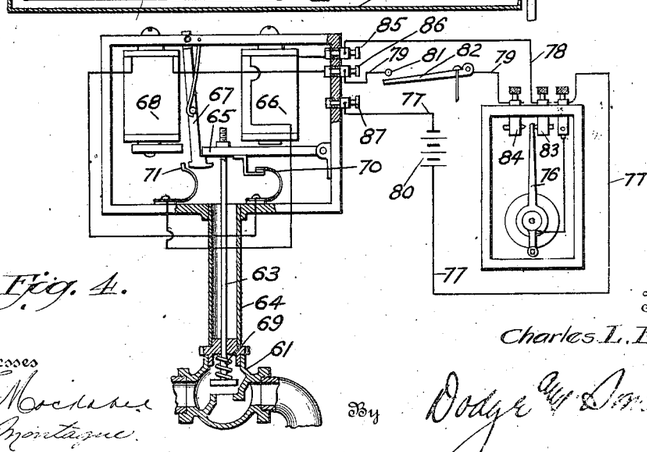
Fig. 4 is a view showing the thermostat in front elevation with the cover removed, and showing the electric valve controlled thereby in partial section together with a diagram of the electrical connections.

Mounted on the tank 54 is a globe valve 61 which discharges to the tank 50 through the discharge 62. The valve 61 is operated by means of a rod 63 (Fig. 4) which extends upward through a tube 64 to a point above the high level of water in the tank 54 and is there connected to a pivoted armature 65. This armature 65 is drawn upward by the energization of an electro-magnet 66, and when in its upward position is latched by a spring held armature 67. This latching armature may be retracted by the energization of an electro-magnet 68 and when so withdrawn the valve 61 is closed by the action of a spring 69. In order to avoid a waste of current the spring contacts 70 and 71 are provided, and so coact with the armatures 65 and 67 that the magnet 68 is cut out of circuit when the armature 65 is in its lowermost position and the magnet 66 is cut out of circuit as soon as the armature 67 is swung to the right far enough to latch the armature 65 in its upper position. In this way the current flowing through the electric valve is cut off instantly the valve has been shifted to its desired position even though the thermostat acts to maintain the circuit. The circuits may be readily traced in Fig. 4 and start from the lowermost binding post 87 which is grounded to the valve casing, thence through the casing to the armatures 65 and 67. When the armature 67 is slightly retracted it contacts with spring 71 and circuit is completed through armature and spring to magnet 66 and thence to binding post 85. At this time armature 65 is down and contact is broken between it and spring contact 70. When armature 65 is slightly above its lowest position it contacts with spring 70 and circuit is completed through it and spring 70 to magnet 68 and thence to the binding post 86. At this time contact is broken between armature 67 and spring 71. Thus each magnet 66 and 68 is cut out of circuit as soon as its action is completed.

Figure 5:
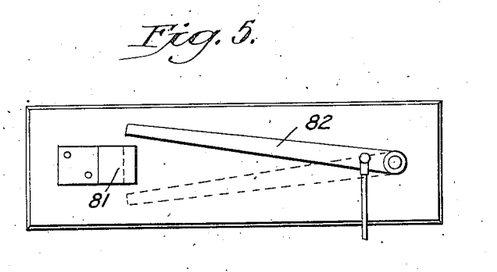
Fig. 5 is a front elevation of the cut-out switch used in the preferred form of the invention to insure the stopping of the device only at the completion of the cycle.
Figure 6:
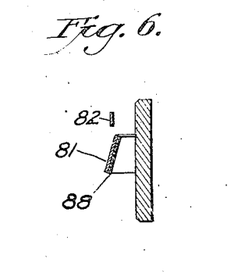
Fig. 6 is a section of the same.

Extending into refrigerator 25 as shown, or if desired into the brine tank 24, either arrangement being possible without change of function, is mounted an electric thermostatic switch indicated generally by the numeral 72. This type of thermostat is now in commercial use and so far as is essential to an understanding of the present invention may be described as consisting of a suitable case 73 extending into and subject to the temperature of the chamber whose temperature is to be controlled, and a helical bimetallic bar 74 mounted in said case and adjustably fixed at one end thereto and at the other end to a shaft 75 which carries a switch arm 76. The switch arm 76 is connected to the neutral wire 77 and swings between two electric contacts one, 83, connected to the "on" wire 78 and the other, 84, to the "off" wire 79. The neutral wire 77 is connected through a battery 80 to binding post 87 and hence to the armatures 65 and 67. The "on" wire 78 is connected directly to binding post 85, that is to the valve-opening magnet 66, and the "off" wire 79 is connected to binding post 86, that is to the valve-closing magnet 68, through an interposed electric switch comprising a contact 81 and a swinging arm 82 coacting therewith and operatively connected to the arm 43. The parts of this switch are so arranged that as the arm 43 drops the arm 82 swings over and momentarily makes contact with the contact 81. As more clearly shown in Figs. 5 and 6 the contact 81 is inclined and is provided with insulation 88 on its rear face. The effect of this is that in the downward movement of the arm 82 contact is made with 81 while in its upward movement the arm 82 contacts only with the insulation 88. This absolutely precludes a stopping action of the thermostat on the upward movement of the arm 43.

The operation of the control mechanism is as follows:—

Suppose that as the device approaches the close of the absorption portion of the cycle the temperature affecting the bimetallic bar 74 has reached the desired minimum. Under these circumstances the arm 76 will swing to the left as viewed in Fig. 4 and make contact from the neutral wire 77 through the "off" wire 79. At the conclusion of the cycle the arm 43 will drop and the arm 82 will make a brief contact with the contact 81. The flow of current taking place through the magnet 68 will withdraw the latching armature 67 allowing the armature 65 to drop and the valve 61 to close. This prevents the supply of any water to the tank 50 and precludes the initiation of the next drive-off cycle.

Figures 1, 3:
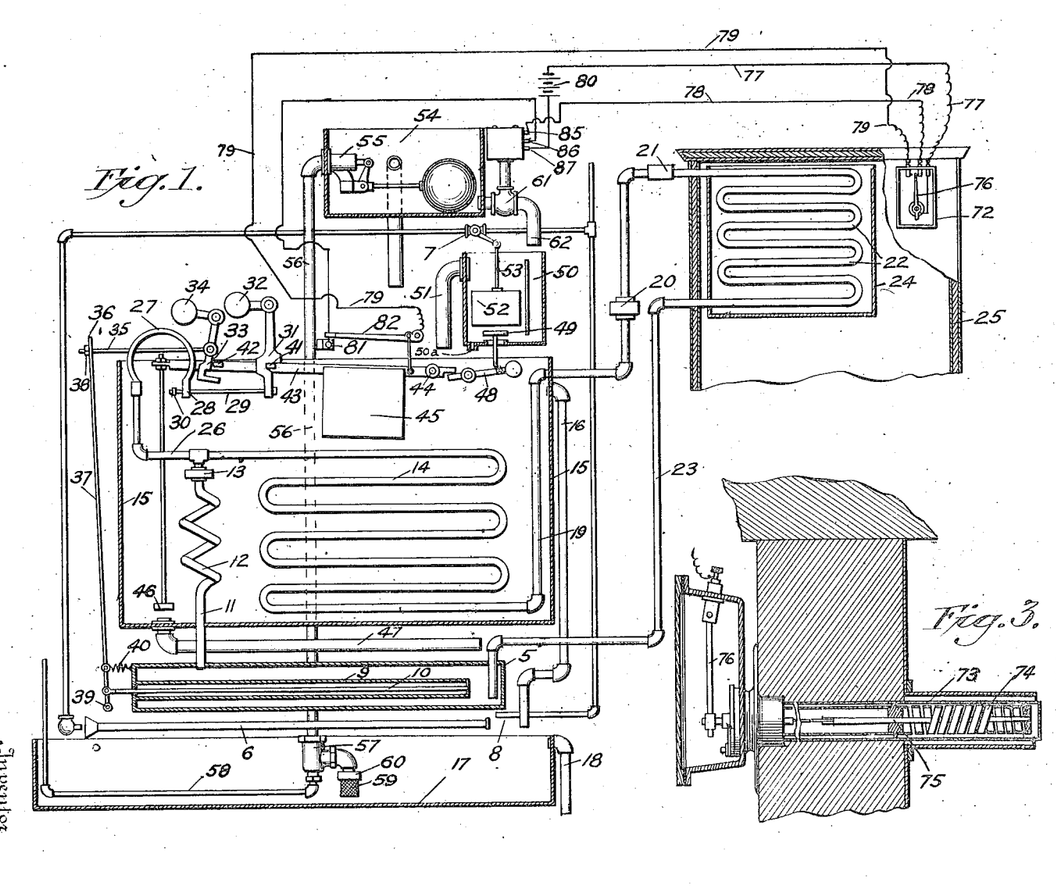
Figure 1 is a diagrammatic view partly sectional showing the device in the absorption position.
Fig. 3 is a longitudinal sectional view of an electrical thermostat suitable for use as an automatic controlling means.
Figure 2:
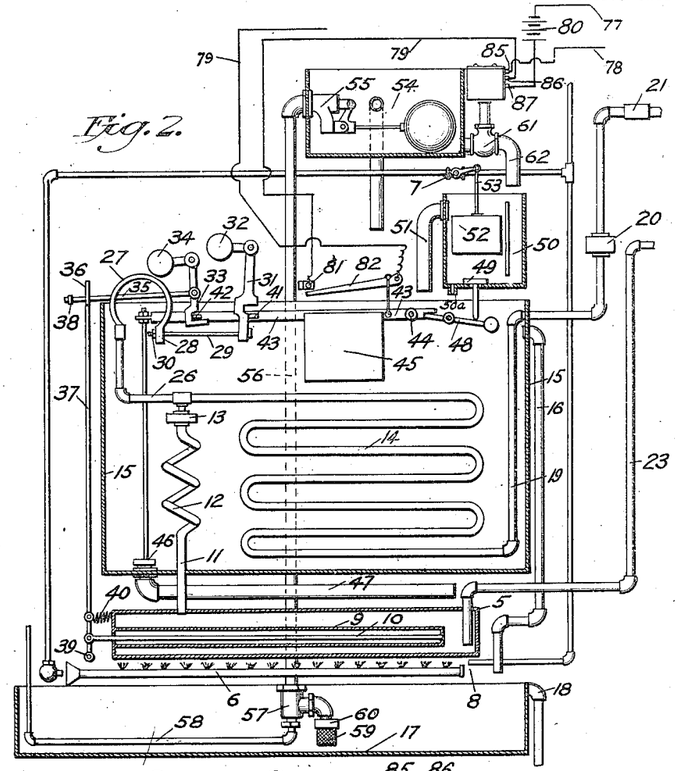
Fig. 2 is a similar view showing the device in the drive-off position, the refrigerated chamber and cooling coils being omitted in this view.

Suppose now that the temperature affecting the bimetallic bar 74 rises above the critical temperature and causes the arm 76 to swing to the right as viewed in Fig. 1. This completes circuit from neutral wire and battery through the "on" wire 78 to the magnet 66. This draws up the armature 65, opens valve 61 and by thus allowing water to flow into tank 50 starts the normal cycle of the machine, the cycle beginning of course with the drive-off. The machine will continue to go through periodic cycles until the arm 82 swings over contact 81 at a time when arm 76 is against contact 84. When this occurs the machine will be stopped just as it is ready to begin a new cycle.

Figure 7:
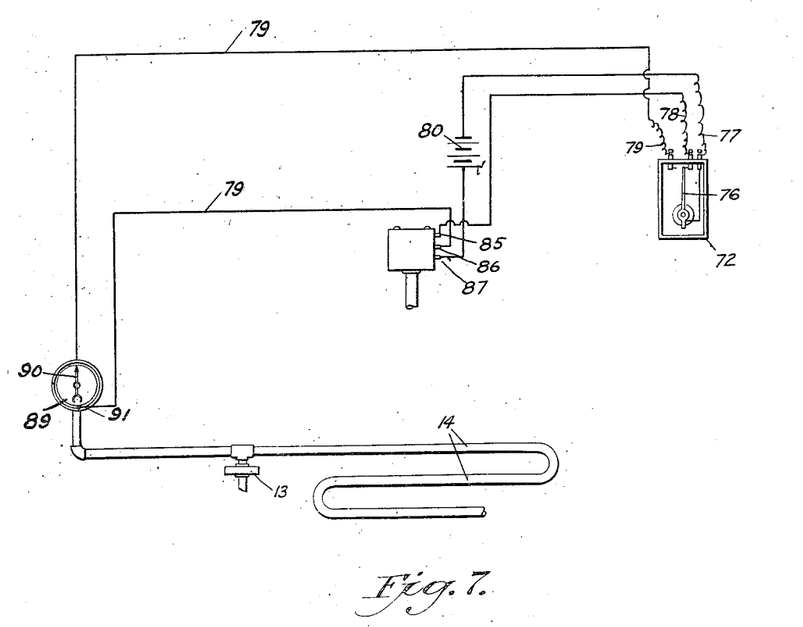
Fig. 7 is a diagrammatic view illustrating an alternative form of the device in which the automatic cut-out is controlled by the pressure in the condensing coil.

Instead of making use of the movement of the arm 43 or associated parts to control the action of the contact 81 and arm 82, I may substitute and make use of the arrangement shown in Fig. 7, in which I substitute for the contact 81 and arm 82 an equivalent device subject to the pressure in the condensing coil 14. It will be observed that the pressure in the coil 14 operates through the Bourdon tube 27 to cause a release of the arm 43 from its upper position. Consequently the pressure in the coil 14 at the moment of reversal is a definite and known quantity. I therefore apply to the coil 14 a gage 89 whose hand 90 serves as a switch arm and contacts with the fixed contact 91 when the pressure in the coil 14 falls to the point at which latch 31 is withdrawn to release the arm 43. As indicated in Fig. 7 the hand 90 and contact 91 are wired into the control circuit and in the same relation as the contact 81 and arm 82 previously described. The operation of the device is therefore fundamentally the same as' the preferred form.

From the above description it will be noted that the operation of the refrigerating device is not affected in intensity but is controlled in frequency or duration to produce the desired refrigerating effect. Second that the throwing of the refrigerating device out of action will occur only at the completion of a thermal cycle. Obviously other forms of thermostats and thermostatically controlled valves can be used and I do not limit myself to the specific one shown.

The provision of the constant level tank 54 is very important because it provides a constant low head on the valve 61 and permits the location of the valve actuating mechanism above any water level that can possibly exist in the supply tank. It will be understood that the showing of the refrigerating mechanism is purely diagrammatic and that the device shown is intended to be illustrative of the general class of devices operating on the absorption principle, and more specifically is intended to be typical of that form of such devices in which a common chamber serves both as the drive-off and absorption chamber. Except, however, as expressly limited in the claims, I regard my control mechanism as applicable generally to refrigerators of the absorption type and contemplate such application.

It is also to be understood that the use of water for cooling and heat-transfer purposes is not absolutely essential, as any liquid capable of performing the same function and capable of control in the general manner described, might be used. Water is, however, the liquid customarily used and I therefore have described the liquid as water in the specification and claims, but with the purpose and understanding that this term is used merely as typical of such a liquid and not with the idea of limiting the invention or the claims therefor to the use of this specific liquid.

Having thus described my invention, what I claim is:—

1. The combination with a refrigerating machine of the absorption type, of means for cutting off the supply of heat to and the dissipation of heat by said machine; a refrigerator cooled by said machine; a thermostat located in the refrigerator or cooling chamber; and operative connections between the thermostat and the heat-controlling means, whereby the action of the machine is completely stopped when the artificially produced temperature is at or below a predetermined point, and is started when said temperature is above such point in the refrigerator or cooling chamber.

2. The combination with a refrigerating machine of the absorption type adapted to perform operative cycles each consisting of a drive-off period and an absorption period, of means for cutting off the supply of heat to and the dissipation of heat by said machine; a refrigerator cooled by said machine; a thermostat located in the refrigerator or cooling chamber; and operative connections between the thermostat and the heat-supply-controlling means, whereby the heat is cut off and the machine is stopped if and only if the artificially produced temperature reaches a predetermined minimum, and whereby the heat is supplied and the machine is again started when the temperature rises above such minimum in said refrigerating chamber.

3. The combination with a refrigerating machine of the absorption type having a combined drive-off and absorption mechanism adapted to perform periodic cycles each consisting of a drive-off period and a succeeding absorption period, of means for cutting off and restoring the heat supply of said machine; a refrigerator cooled by said machine; a thermostat located in the refrigerating chamber and controlled solely by the artificial temperature created therein; and operative connections between the heat-supply-controlling means and the thermostat, whereby the heat is cut off when and so long as the artificially produced temperature is at or below a predetermined minimum in said refrigerating chamber.

4. The combination with a refrigerating machine of the absorption type having a combined drive-off and absorption mechanism adapted to perform periodic cycles each consisting of a drive-off period and a succeeding absorption period, of means for cutting off and restoring the heat supply of said machine; a refrigerator cooled by said machine; a thermostat located in the refrigerating chamber and controlled solely by the artificial temperature created therein; and operative connections between the heat-supply-controlling means and the thermostat, serving to stop entirely the operation of the machine at the completion of any absorption period if such temperature is then at or below the desired minimum, and to start said machine when the temperature rises above said minimum in said refrigerating chamber.

5. The combination with a refrigerating machine of the absorption type having a combined drive-off and absorption mechanism, and a float-actuated mechanism for causing said drive-off and absorption mechanism to perform periodic cycles each consisting of a drive-off period and a succeeding absorption period; of a valve for controlling the flow of the fluid to actuate said float; a refrigerating chamber cooled by said machine; a thermostat located in the refrigerating chamber; and operative connections between said valve and said thermostat, whereby said valve is opened and closed in response to variations in temperature in said refrigerating chamber.

6. The combination with a refrigerating machine of the absorption type having a combined drive-off and absorption mechanism, and a float actuated mechanism for causing said drive-off and absorption mechanism to perform periodic cycles each consisting of a drive-off period and a succeeding absorption period; of a valve for controlling the flow of the fluid to actuate said float; a thermostat subject to the artificial temperature created by said machine and operatively connected to said valve to open and close the latter in response to variations in said temperature; and a secondary control device adapted to be actuated by the movements of said float actuated mechanism to prevent the closing of said valve by said thermostat in certain positions of said float actuated mechanism.

7. The combination with a refrigerating machine of the absorption type having a combined drive-off and absorption mechanism, a gas condensing chamber, and a mechanism for causing said machine to perform periodic cycles each consisting of a drive-off period and a succeeding absorption period, of a thermostat subject to the artificial temperature produced by said machine and operatively connected with said machine to start and stop the action of the latter in response to variations of said temperature; and a secondary control device subject to the pressure in said condensing chamber and adapted to prevent the stopping of said machine by said thermostat when said pressure is above a predetermined point.

8. The combination with a refrigerating machine of the absorption type adapted to perform a thermal cycle consisting of a drive-off and an absorption period and having a moving part which is automatically moved at the completion of the absorption period, of an automatic thermostatic device, operative connections between said thermostatic device and said machine for starting the latter by the action of the former; interrupted operative connections between said thermostat and machine for stopping the latter by the action of the former; and a connecting means for said interrupted operative connections, adapted to be operated by the movement of said moving part, to permit the stopping action of said thermostat at and only at the completion of the absorption period.

9. The combination with a refrigerating machine of the absorption type provided with a cycle-controlling means adapted to be actuated by the flow of water through said machine, and with a refrigerating machine to be cooled by said machine, of a thermostat located in the refrigerating chamber; a valve controlling the cycle controlling the flow of water to said machine; and operative connections between the thermostat and valve to open and close the latter by the action of the former.

10. The combination with a refrigerating machine of the absorption type adapted to be kept in operation by the flow of water thereto, to perform thermal cycles each consisting of a drive-off period and an absorption period, of a thermostat subject to the artificial temperature created by said machine; a valve operated thereby and controlling the flow of water to said machine; and a secondary control actuated by a member responsive to the progress of the thermal cycle in said machine and adapted to prevent the closing of said valve by said thermostat except at the completion of the absorption period of the cycle.

11. The combination with a refrigerating machine of the absorption type provided with a cycle-controlling means adapted to be actuated by the flow of water through said machine, and with a refrigerator to be cooled by said machine, of an electrically-actuated valve for controlling the cycle controlling the flow of such water; and a thermostatic switch located in the refrigerating chamber, and electrically connected with said valve to operate the same.

12. The combination with a refrigerating machine of the absorption type adapted to be kept in operation by the flow of water thereto, to perform thermal cycles each consisting of a drive-off period and an absorption period, of a thermostatic switch subject to the artificial temperature created by said machine and adapted to close two electric circuits in alternation; and electrically actuated valve adapted to control the flow of water to said machine; a source of current; suitable electric circuits including said source of current thermostatic switch and electric valve, the first circuit when closed causing opening of said valve and the second circuit when closed causing closing of said valve; a normally open switch, included in said second circuit; and a member moving in response to the progress of the thermal cycle and operatively connected to said normally open switch to close the same at the completion of the absorption period.

13. The combination with a refrigerating machine of the absorption type adapted to be kept in operation by the flow of water thereto to perform thermal cycles each consisting of a drive-off period and an absorption period, of a thermostatic switch subject to the artificial temperature created by said machine; an electrically actuated valve controlled by said switch and itself controlling the flow of water to said machine; a normally open cut-out switch interposed between said thermostatic switch and said electrically actuated valve, and serving when open to prevent the closing of said valve by said thermostatic switch; and a part moving in response to the progress of the thermal cycle in said machine and operatively connected with said normally open switch to close the same temporarily at the close of the absorption period of the cycle.

14. The combination with a refrigerating machine of the absorption type having a combined drive-off and absorption mechanism, and a float actuated mechanism for causing said drive-off and absorption mechanism to perform periodic cycles each consisting of a drive-off period and a succeeding absorption period; of an electrically actuated valve for controlling the flow of fluid to actuate said float; a thermostatic electric switch, subject to the artificial temperature created by said machine and electrically connected with said electrically actuated valve to open and close the same in response to variations in said temperature; and a second electric switch operatively connected to said float actuated mechanism to be opened and closed by the movement thereof and adapted to prevent the closing of said electrically actuated valve by said thermostatic switch, in certain positions of said float actuated mechanism.

15. The combination with a refrigerating machine of the absorption type having a combined drive-off and absorption mechanism, a gas condensing chamber, and a mechanism for causing said machine to perform periodic cycles each consisting of a drive-off period and a succeeding absorption period, of an electrically actuated device for alternately starting and stopping said machine; a thermostatic electric switch subject to the artificial temperature created by said machine, and electrically connected to said electrically actuated device to control the action of the same; and a pressure controlled electric switch subject to the pressure in said condensing chamber and adapted to prevent the stopping action of said electrically actuated device when said pressure is above a predetermined point.

16. The combination of a machine for creating artificial temperatures adapted to be kept in operation by the flow of water thereto; a source of water; a constant level reservoir fed thereby; a valve for controlling the outflow from said reservoir to said machine; and a thermostat subject to the artificial temperature created by said machine and operatively connected to said valve to open and close the same in response to the variations in said temperature.

17. The combination of a machine for creating artificial temperatures by the repetition of thermal cycles and having a part actuated by the flow of water to said machine to cause the performance of said cycles; a source of water; a relatively shallow constant level reservoir fed thereby; a valve for controlling the outflow from said reservoir to said machine; a thermostat subject to the artificial temperature created by said machine and operatively connected to said valve to open and close the same in response to variations in said temperature; and a secondary control device responsive to the progress of the thermal cycles of said machine and adapted to prevent the closing of said valve by said thermostat except at the termination of a complete cycle.

18. The combination of a machine for creating artificial temperatures, adapted to be kept in operation by the flow of water thereto; a source of water; a constant level reservoir fed thereby; an electrically actuated valve for controlling the flow from said reservoir to said machine; and a thermostatic electric switch subject to the artificial temperature created by said machine and electrically connected to said electrically actuated valve to open and close the same in response to variations in said temperature.

19. The combination of a machine for creating artificial temperatures by the repetition of periodic thermal cycles and having a part actuated by the flow of water to said machine to cause the performance of said cycles; a source of water; a constant level reservoir fed thereby; an electrically actuated valve for controlling the outflow from said machine; a thermostatic electric switch subject to the artificial temperature created by said machine and electrically connected to said electrically actuated valve to open and close the same in response to variations in said temperature; and a second electric switch operatively connected to the part of said machine actuated by the flow of water, to be closed by the movements thereof at the completion of a cycle, and adapted when open to prevent the closing of said electrically actuated valve by said thermostatic switch.

20. A control device comprising in combination a constant level reservoir; a valve for controlling the outflow of water therefrom; an actuator operatively connected with said valve to open and close the latter and comprising electro-magnets, armatures and automatic switches for cutting said magnets out of circuit at the completion of their respective valve shifting actions; and a thermostatic electric switch electrically connected to control the energization of the magnets of said actuator.

21. A valve mechanism for automatic control devices comprising a constant level reservoir; a valve adapted to control the flow of water therefrom; and an actuator located above the water level in said reservoir, mechanically connected with said valve to open and close the same and comprising electro-magnets, armatures therefor, and automatic switches adapted to be actuated by said armatures to cut said magnets out of circuit at the completion of their respective valve-shifting actions.

22. An automatic control device comprising in combination a source of water under pressure; an injector mechanism actuated thereby to draw water from a secondary source and having a check valve to prevent back flow; a constant level float valve adapted to control the flow of water from both said sources; a tank fed by said float valve; an electrically actuated valve for controlling the outflow of water from said tank; and a thermostatic switch electrically connected to said electrically actuated valve to open and close the same in response to temperature variations.

23. An automatic control device comprising in combination a source of water under pressure, an injector mechanism actuated thereby to draw water from a secondary source and having a check valve on suction side to prevent back flow; a constant level valve adapted to control the flow of water from both said sources; a thermostatically controlled valve for controlling the outflow of water from said sources; and a thermostat operatively connected to said last named valve.

24. The combination of a machine for creating artificial temperatures by the repetition of thermal cycles and having a part actuated by the flow of water to said machine to cause the performance of said cycles; a source of water; a valve for controlling the flow of water from said source; a thermostat subject to the artificial temperature created by said machine and operatively connected to said valve to open and close the same in response to variations in said temperature; a secondary control device responsive to the progress of the thermal cycles of said machine and adapted to prevent the closing of said valve by said thermostat except at the termination of a complete cycle.

25. An automatic control device comprising in combination a source of water under pressure, an injector mechanism actuated thereby to draw water from a secondary source, a valve adapted to control the flow of water from both said sources, and a thermostat operatively connected to said valve.

In testimony whereof I have signed my name to this specification in the presence of two subscribing witnesses.

CHARLES L. FORTIER.

Witnesses:
PAUL JOHNSON,
F. M. ZEALLEY.